(12) United States Patent
Johnson et al.

(10) Patent No.: US 8,066,515 B2
(45) Date of Patent: Nov. 29, 2011

(54) MULTIPLE GRAPHICS ADAPTER CONNECTION SYSTEMS

(75) Inventors: Philip B. Johnson, Campbell, CA (US);
Liping Yu, Mountain View, CA (US);
Ludger Mimberg, San Jose, CA (US);
Ross F. Jatou, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2031 days.

(21) Appl. No.: 10/991,169

(22) Filed: Nov. 17, 2004

(65) Prior Publication Data

US 2006/0274073 A1    Dec. 7, 2006

(51) Int. Cl.
*H01R 12/00* (2006.01)
(52) U.S. Cl. ............................................. 439/61
(58) Field of Classification Search .............. 439/65, 439/61, 59, 502, 631
See application file for complete search history.

(56) References Cited

U.S. PATENT DOCUMENTS

| | | | |
|---|---|---|---|
| 3,492,538 A * | 1/1970 | Fergusson ................. 361/803 |
| 4,647,123 A * | 3/1987 | Chin et al. ................. 439/61 |
| 5,448,655 A | 9/1995 | Yamaguchi |
| 5,502,808 A | 3/1996 | Goddard et al. |
| 5,522,027 A | 5/1996 | Matsumoto et al. |
| 5,784,628 A | 7/1998 | Reneris |
| 5,794,016 A | 8/1998 | Kelleher |
| 5,936,640 A | 8/1999 | Horan et al. |
| 5,999,198 A | 12/1999 | Horan et al. |
| 6,023,281 A | 2/2000 | Grigor et al. |
| 6,111,757 A * | 8/2000 | Dell et al. ................. 361/737 |
| 6,191,800 B1 | 2/2001 | Arenburg et al. |
| 6,195,734 B1 | 2/2001 | Porterfield |
| 6,253,299 B1 | 6/2001 | Smith et al. |
| 6,296,493 B1 * | 10/2001 | Michiya .................... 439/66 |
| 6,326,973 B1 | 12/2001 | Behrbaum et al. |
| 6,329,996 B1 | 12/2001 | Bowen et al. |

(Continued)

FOREIGN PATENT DOCUMENTS

EP        0428277        5/1991

(Continued)

OTHER PUBLICATIONS

Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

(Continued)

*Primary Examiner* — Tulsidas C Patel
*Assistant Examiner* — Phuong Nguyen
(74) *Attorney, Agent, or Firm* — Patterson & Sheridan, LLP (57) ABSTRACT

A system provides a digital multi-bit connection between two or more graphics adapters. Each graphics adapter is manufactured as a printed circuit board including a finger-type edge connector. When two or more graphics adapters are installed in a system the edge connectors of each graphics adapter may be coupled to each other via a connection device that provides a portion of the digital multi-bit connection. The remainder of the digital multi-bit connection is provided by conductive traces coupling each finger of the edge connector to a graphics processing unit that is affixed to the graphics adapter. The connection device may be installed by an end-user as each additional graphics adapter is installed in the system.

19 Claims, 7 Drawing Sheets

U.S. PATENT DOCUMENTS

| | | | |
|---|---|---|---|
| 6,473,086 | B1 | 10/2002 | Morein et al. |
| 6,501,999 | B1 | 12/2002 | Cai |
| 6,535,939 | B1 | 3/2003 | Arimilli et al. |
| 6,593,932 | B2 | 7/2003 | Porterfield |
| 6,631,474 | B1 | 10/2003 | Cai et al. |
| 6,633,296 | B1 | 10/2003 | Laksono et al. |
| 6,683,614 | B2 | 1/2004 | Walls et al. |
| 6,711,638 | B1 | 3/2004 | Wu |
| 6,750,870 | B2 | 6/2004 | Olarig |
| 6,760,031 | B1 | 7/2004 | Langendorf et al. |
| 6,882,346 | B1 | 4/2005 | Lefebvre et al. |
| 6,902,419 | B2 * | 6/2005 | Conway et al. ............ 439/347 |
| 6,919,896 | B2 | 7/2005 | Sasaki et al. |
| 7,030,837 | B1 | 4/2006 | Vong et al. |
| 7,176,847 | B2 | 2/2007 | Loh |
| 7,184,003 | B2 | 2/2007 | Cupps et al. |
| 2002/0047851 | A1 | 4/2002 | Hirase et al. |
| 2002/0093507 | A1 | 7/2002 | Olarig |
| 2002/0105523 | A1 | 8/2002 | Behrbaum et al. |
| 2002/0118201 | A1 | 8/2002 | Mukherjee et al. |
| 2003/0128216 | A1 | 7/2003 | Walls et al. |
| 2003/0137483 | A1 | 7/2003 | Callway |
| 2004/0072460 | A1 * | 4/2004 | Conway et al. ............ 439/325 |
| 2004/0104913 | A1 | 6/2004 | Walls et al. |
| 2005/0017980 | A1 | 1/2005 | Chang et al. |
| 2005/0088445 | A1 | 4/2005 | Gonzalez et al. |
| 2005/0134588 | A1 | 6/2005 | Aila et al. |
| 2005/0160212 | A1 | 7/2005 | Caruk |
| 2005/0278559 | A1 | 12/2005 | Sutradja et al. |

FOREIGN PATENT DOCUMENTS

| | | |
|---|---|---|
| EP | 0571969 A2 | 12/1993 |
| FR | 2834097 A1 | 6/2003 |
| FR | 2839563 A1 | 11/2003 |
| JP | 5324583 A | 12/1993 |
| TW | 328392 | 3/1998 |
| TW | 570243 | 1/2004 |
| WO | WO 03/083636 A1 | 10/2003 |

OTHER PUBLICATIONS

English Translation of: Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

Whitman, Scott, "Dynamic Load Balancing for Parallel Polygon Rendering," IEEE Computer Graphics and Applications, IEEE Inc., New York, vol. 14, No. 4, Jul. 1, 1994.

Henry Fuchs, Distributing a visible surface algorithm over multiple processors, Proceedings of the 1977 annual conference, p. 449-451. Jan. 1977.

Edward Brown, Andy Thorne, "FireWire Audio Application utilizing high quality 96kHz 24bit I/O", Copyright Oxford Semiconductor 2004 © External—Free Release, Jul. 2004.

Marc Prieur, "NVIDIA GeForce 6600 GT—HardWare.fr," Sep. 7, 2004, retrieved from http://www.hardware.fr/art/imprimer/514, pp. 1-23.

English translation of: Marc Prieur, "NVIDIA GeForce 6600 GT—HardWare.fr," Sep. 7, 2004, retrieved from http://www.hardware.fr/art/imprimer/514. pp. 1-24.

Scott Wasson, "NVIDIA's SLI Resurrects GPU Teaming: Kickin' It Old School—With 32 Pipes", Jun. 28, 2004, retrieved from http://techreport.com/articles.x/6931. 5 pgs.

PCT Search Report.

Wasson, "NVIDIA's SLI resurrects GPU teaming Kickin' it old school—with 32 pipes", www.techreport.com, Jun. 28, 2004, pp. 1-3, http://techreport.com/etc/2004q2/nvidia-sli/.

Weinand, "NVIDIA lance le SLI: une technologie multi-GPU", www.erenumerique.fr, Jun. 29, 2004. pp. 1-7 http://www.erenumerique.fr/nvidia_lance_le_sli_une_technologie_multi_gpu-art-655-7.html.

"Alienware Announces Video Array and X2: An Exclusive Advancement in PC Graphics Technology", Alienware, May 12, 2004, <http://www.alienware.com/press_release_pages/press_release_template.aspx?FileName=press051204.asp>.

Alienware Promises Fastest Graphics Solution, Alienware, Jun. 28, 2004, <http://www.alienware.com/press_release_pages/press_release_template.aspx?FileName=press062804.asp>.

"Frequently Asked Questions", Alienware, Oct. 22, 2004, <http://www.alienware.com/alx_pages/main_content.aspx>.

Office Action. U.S. Appl. No. 11/012,394. Dated Apr. 28, 2009.

Translated Search Report for ROC (Taiwan) Patent Application No. 094140479, provided as concise explanation of relevance of TW 570243 and TW 328392, date of completion Feb. 15, 2009.

Office Action. U.S. Appl. No. 10/950,609. Dated Feb. 26, 2009.

Final Office Action. U.S. Appl. No. 11/012,394 dtd. Nov. 6, 2009.

Angelly, Clay. "NVIDIA GeForce 6600 Series Preview," nvnews, published on Aug. 12, 2004 (available at URL: http://www.nvnews.net/previews/geforce_6600_series/).

Gotoh, Hirosige, "Weekly Overseas News: NVIDIA Dual-GPU Solutions," PCWatch home page, published on Jun. 29, 2004 (available at URL: http://pc.watch.impress.co.jp/docs/2004/0629/kaigai099.htm).

Gotoh, Hirosige, "Weekly Overseas News: Questions Many of NVIDIA's SLI," PC Watch home page, published on Aug. 30, 2004 (available at URL: http://pc.watch.impress.co.jp/docs/2004/0830/kaigai113.htm).

English translation of: Gotoh, Hirosige, "Weekly Overseas News: NVIDIA Dual-GPU Solutions," PCWatch home page, published on Jun. 29, 2004 (available at URL: http://pc.watch.impress.co.jp/docs/2004/0629/kaigai099.htm).

English translation of: Gotoh, Hirosige, "Weekly Overseas News: Questions Many of NVIDIA's SLI," PC Watch home page, published on Aug. 30, 2004 (available at URL: http://pc.watch.impress.co.jp/docs/2004/0830/kaigai113.htm).

Excepts from letter received from foreign associate re. JP Patent App. No. 2007-543190, dated Feb. 1, 2010, provided as explanation of relevance of foreign language references.

Sassen, Sander. "NVIDIA SLI, SLI's back with a vengeance," hardwareanalysis.com, Jun. 28, 2004.

Anand, Vijay. "NVIDIA's Scalable Link Interface (SLI)," HardwareZone.com, Jun. 30, 2004.

Final Office Action, U.S. Appl. No. 11/013,078, dtd Jul. 1, 2010.

Office Action, U.S. Appl. No. 11/013,078 dated Dec. 27, 2010.

Office Action, U.S. Appl. No. 11/012,394 dated Jan. 20, 2011.

* cited by examiner

MULTIPLE GRAPHICS ADAPTER CONNECTION SYSTEMS

BACKGROUND OF THE INVENTION

1. Field of the Invention

One or more aspects of the invention generally relate to graphics processing, and more particularly to connecting graphics adapters in a multi-adapter graphics processing system.

2. Description of the Related Art

Conventional graphics adapters are not configured such that an end-user having an existing system with a single graphics adapter may install an additional graphics adapter to improve performance for graphics processing for a single display device. Prior art graphics processing systems, such as 3 df's VooDoo2™ graphics adapter product configured for scan line interleave (SLI) or Metabyte/Wicked 3D's parallel graphics configuration (PGC), increase graphics processing performance by using two graphics adapters in a fixed configuration that is not modular such that an end-user can install the second graphics adapter.

The prior art graphics processing systems use a proprietary interface and cabling to transfer an analog pixel stream produced by each graphics adapter to a pixel multiplexing device which selects one of the two analog pixel streams for output to the single display device. Because the prior art configuration is fixed, the end-user cannot install and connect an additional graphics adapter to the proprietary interface to improve graphics processing performance for the single display device. Furthermore, because the pixel streams are combined in the analog domain visual artifacts may result due to mismatches between digital to analog converters on each graphics adapter.

Accordingly, it is desirable to facilitate end-user installation of additional graphics adapters including installation of a multi-bit digital connection between two or more graphics adapters to improve graphics processing performance.

SUMMARY OF THE INVENTION

The current invention involves new systems and methods for providing a multi-bit digital interface between two or more graphics adapters. A connection device couples to finger-type edge connectors on each graphics adapter to couple the graphics adapters to each other, providing the multi-bit digital interface. Use of the finger-type edge connector does not require any additional socket or socket-type connector on the graphics adapter. An end-user may install an additional graphics adapter and connect it to an existing graphics adapter by installing the connection device. One of the graphics adapters may be configured to digitally combine pixel data produced by each graphics adapter for output to a single display device.

Various embodiments of the invention include a graphics adapter printed circuit board including a system connector, a first graphics processing unit coupled to the system connector, and a graphics edge connector that is coupled to the first graphics processing unit. The system connector is configured to couple the graphics adapter printed circuit board to a motherboard. The first graphics processing unit is affixed to the graphics adapter printed circuit board. The graphics edge connector is configured to couple to a first socket within a removable connection device, the removable connection device providing a portion of a multi-bit digital connection between the first graphics processing unit and a second graphics processing unit affixed to another graphics adapter printed circuit board when the graphics edge connector is coupled to the first socket within the removable connection device, the removable connection device including a second socket, wherein the first socket and the second socket are electrically connected to provide the portion of the multi-bit connection between the first graphics processing unit and the second graphics processing unit.

Various embodiments of the invention include a connection device for providing a multi-bit digital connection between a first graphics adapter and a second graphics adapter. The connection device includes a first socket, a second socket, and electrically conductive connections coupling each bit of the first socket to the second socket to provide the multi-bit digital connection between the first graphics adapter and the second graphics adapter. The first socket is configured to couple to a graphics edge connector included within a printed circuit board supporting the first graphics adapter. The second socket is configured to couple to a graphics edge connector included within a printed circuit board supporting the second graphics adapter.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Each graphics adapter is manufactured as a printed circuit board (PCB) including a finger-type edge connector configured to couple to a removable connection device designed for installation by an end-user. The incremental cost of the edge connector is less than a traditional socket-type connector that may be affixed to the graphics adapter. When two or more graphics adapters are installed in a system the graphics edge connectors of each graphics adapter may be coupled to each other via the connection device providing a dedicated digital multi-bit connection between the graphics adapters. The connection device may be installed by an end-user as each additional graphics adapter is installed in the system. Furthermore, the digital multi-bit connection may be used to transfer image data from one graphics adapter to another for output to a display device. Image data produced by one graphics adapter may be combined with image data produced by another graphics adapter in the digital domain, prior to digital to analog conversion for output to a display.

Figure 1:
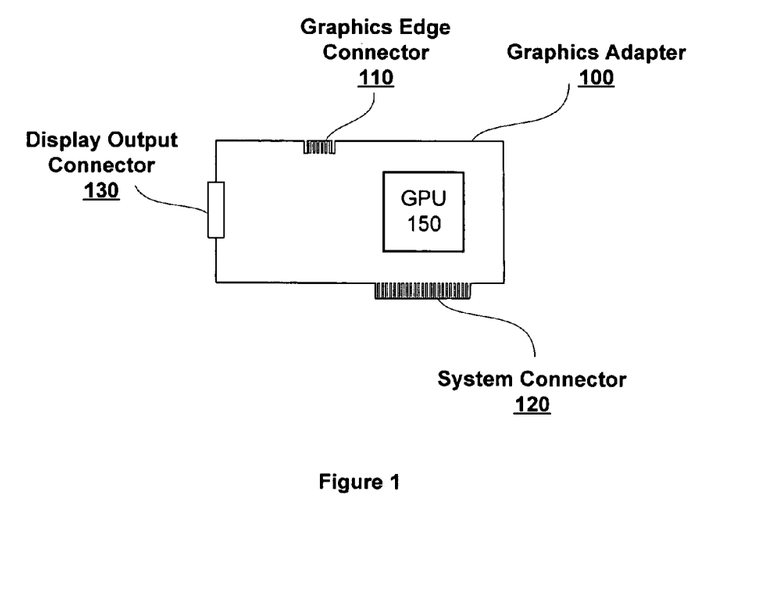
FIG. 1 is an exemplary embodiment of a graphics adapter in accordance with one or more aspects of the present invention.

FIG. 1 is an exemplary embodiment of a graphics adapter 100 in accordance with one or more aspects of the present invention. Typically a PCB including a finger-type system connector 120 that is configured to connect to a system motherboard slot supports Graphics adapter 100. Conductive "fingers" are affixed to the PCB when graphics adapter 100 is manufactured to produce system connector 120. System connector 120 typically conforms to an industry standard interface specification, such as peripheral component interface express (PCI-Express™). In some embodiments of the present invention system connector 120 is replaced with a socket-type connector or a connector that is affixed to the PCB during the manufacturing process.

A GPU (graphics processing unit) 150 is affixed to a PCB supporting graphics adapter 100 and is coupled to system connector 120 by wire traces on the PCB. GPU 150 typically receives graphics data and instructions from a host processor through system connector 120. GPU 150 is also coupled to a finger-type graphics edge connector 110 by wire traces on the PCB. A display output connector 130 is typically exposed through an enclosure containing graphics adapter 100 installed on a motherboard so that an end-user may connect a display device input connector to display output connector 130.

When multiple graphics adapters are installed in a system and GPU 150 is configured as a slave device, GPU 150 outputs image data (processed graphics data) to graphics edge connector 110. When one or more graphics adapters are installed in a system and GPU 150 is configured as a master device, GPU 150 outputs image data to a display output connector 130 using wire traces on the PCB. In some embodiments of the present invention, when GPU 150 is configured as a master device and multiple graphics adapters are installed in a system, GPU 150 outputs display synchronization signals, e.g. horizontal and vertical sync, to graphics edge connector 110.

In some embodiments of the present invention, graphics edge connector 110 includes signals for two ports, one for use when GPU 150 is configured as a slave device and another for use when GPU 150 is configured as a master device. In other embodiments of the present invention, graphics edge connector 110 includes signals for a single port and the signals input and output by GPU 150 to/from the port vary depending on whether GPU 150 is configured as a master device or as a slave device.

Figure 2A:
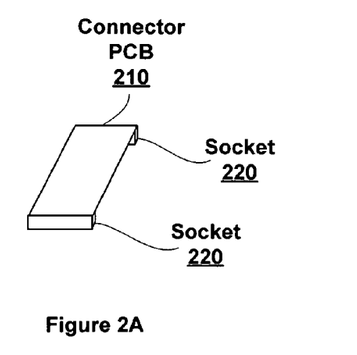
FIGS. 2A and 2B are exemplary embodiments of connection devices in accordance with one or more aspects of the present invention.

FIGS. 2A and 2B are exemplary embodiments of connection devices in accordance with one or more aspects of the present invention. A connection device may be installed between two graphics adapters to couple signals within each graphics edge connector 110. An embodiment of a connection device, designed for installation or removal by an end-user, shown in FIG. 2A includes a connector PCB 210 with a socket 220 affixed to opposing ends of connector PCB 210. Conductive traces are fabricated as part of connector PCB 210 to directly connect pins of socket 220 on one end of connector PCB 210 to pins of socket 220 on the opposing end of connector PCB 210. In some embodiments of the present invention, additional components may be included on connector PCB 210, such as termination devices, pull-up or pull-down resistors, or the like. In other embodiments of the present invention, still other components may be included on connector PCB 210, as described in conjunction with FIGS. 6A and 6B.

Figure 2B:
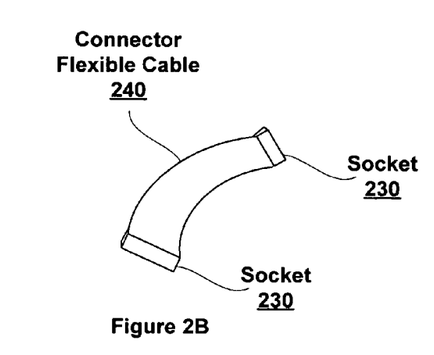

Another embodiment of a connection device, designed for installation or removal by an end-user, shown in FIG. 2B includes a connector flexible cable 240 with a socket 230 affixed to each end of connector flexible cable 240. Connector flexible cable 240 includes wires within a flexible insulating wrapping that directly connect pins of socket 230 on one end of connector flexible cable 240 to pins of socket 230 on the opposing end of connector flexible cable 240. Those skilled in the art will recognize that other components and mechanisms may be employed to produce a connection device.

A connection device, such as those illustrated in FIGS. 2A and 2B provides a multi-bit connection for several signals. For example, image data may be transferred from a slave device to a master device or to another slave device using a number of single bit connections for data, a data valid signal, and a clock. The data and data valid may be transferred on one or both edges of the clock. One or more buffer management signals may also be connected between GPUs using the connection device. In some embodiments of the present invention, a buffer management signal indicates when all of the GPUs producing image data for a display should swap buffers, i.e., swap the back buffer with the front buffer. Raster synchronization signals may also be transferred from a master device to a slave device to communicate the display raster position.

Figure 3:
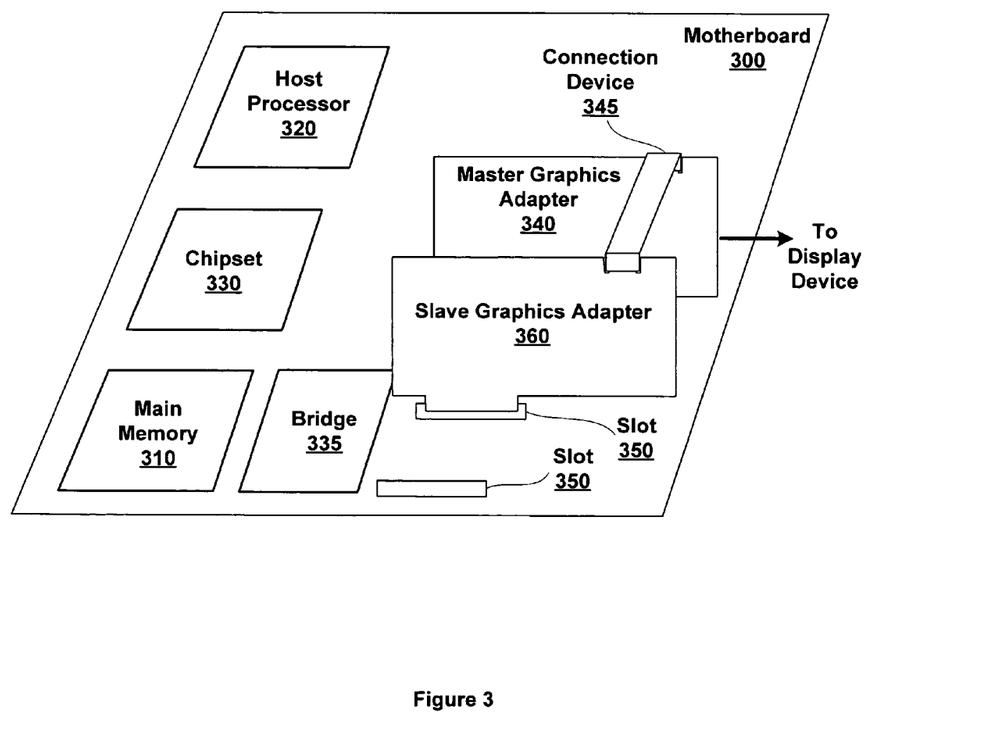
FIG. 3 is an exemplary embodiment of a graphics processing system in accordance with one or more aspects of the present invention.

FIG. 3 is an exemplary embodiment of a graphics processing system in accordance with one or more aspects of the present invention. A motherboard 300 may be included within a desktop computer, server, laptop computer, palm-sized computer, tablet computer, game console, cellular telephone, computer based simulator, or the like. Motherboard 300 includes a host processor 320, a main memory 310, and a chipset 330 that is directly coupled to a bridge 335. In some embodiments of motherboard 300, chipset 330 may include a system memory bridge and an input/output (I/O) bridge that may include several interfaces such as, Advanced Technology Attachment (ATA) bus, Universal Serial Bus (USB), Peripheral component interface (PCI), or the like. A bridge 335 provides an interface between chipset 330 and any graphics adapter installed in a slot 350.

A master graphics adapter 340 is coupled to motherboard 300 via a slot 350. A slave graphics adapter 360 is coupled to motherboard via another slot 350. Although only a single slave graphics adapter 360 is illustrated, additional slave graphics adapters 360 and additional master graphics adapters may be installed on motherboard 300. An end-user can easily install each graphics adapter and a connection device 345, such as the connection devices shown in FIGS. 2A and 2B, as desired to improve rendering performance in terms of image quality or rendering speed. For example, two or more graphics adapters may be used to render images with improved image quality or two or more graphics adapters may be used to render images at a higher frame rate. Furthermore, the graphics edge connector of a graphics adapter may be positioned such that when connection device 345 is coupled to the graphics edge connector, connection device 345 does not protrude more that one centimeter beyond the graphics adapter. Therefore, connection device 345 may be entirely enclosed within a system enclosure containing motherboard 300, master graphics adapter 340, and slave graphics adapter 360.

In some embodiments of the present invention, master graphics adapter 340 is directly coupled to at least one display device and slave graphics adapter 360 is directly coupled to at least one display device. In other embodiments of the present invention, master graphics adapter 340, is directly coupled to two or more display devices. One or more slave graphics adapters 360 provide image data to master graphics adapter 340 via connection device 345, embodiments of which are described in conjunction with FIGS. 2A, 2B, 6A, and 6B. Connection device 345 is coupled to graphics edge connectors on master graphics adapter 340 and slave graphics adapter 360. In some embodiments of the present invention a connection device such as that shown in FIG. 2B (including connector flexible cable) may be used to couple graphics adapters of different heights or with misaligned graphics edge connectors.

A primary connection between master graphics adapter 340 and one or more slave graphics adapters 360 is provided by bridge 335. In some embodiments of the present invention, the primary connection couples master graphics adapter 340 and one or more slave graphics adapters 360 through bridge 335, chipset 330, and main memory 310 and data transfers between master graphics adapter 340 and the one or more slave graphics adapters 360 are controlled by host processor 320.

Master graphics adapter 340 outputs image data to a display device, such as a cathode ray tube (CRT), flat panel display, or the like. Slave graphics adapter 360 may process a larger portion of an image than master graphics adapter 340 and transfer the larger portion of the image to master graphics adapter 340 via connection device 345. In some embodiments of the present invention, processing of the image may be distributed between master graphics adapter 340 and one or more slave graphics adapters 360 based on the processing capability of each graphics adapter. Furthermore, synchronization signals, e.g., buffer swap, horizontal sync, and vertical sync, may be transferred between slave graphics adapter 360 and primary graphics adapter 340 using connection device 345.

In one embodiment of the present invention, 12 bits of image data, a data enable signal, and a clock are output by slave graphics adapter 360. A horizontal sync and vertical sync are output by master graphics adapter 340 to slave graphics adapter 360. A buffer swap signal is a tristate signal, specifically a wired AND using a pull-up component that is pulled low by each graphics adapter that is ready to swap buffers. Each graphics adapter also samples the buffer swap signal to determine when all of the graphics adapters are ready to swap buffers.

In some embodiments of the present invention, connection device 345 configures each graphics adapter coupled to it as either a master graphics adapter or as a slave graphics adapter. For example, a single bit connection within each socket of connection device 345 configures master graphics adapter 340 as a master graphics adapter and configures slave graphics adapter 360. Specifically, a graphics driver reads the state of the single bit connection set by connection device 345 and configures each graphics adapter accordingly. In those embodiments of the present invention, the configuration of master and slave may be reversed by installing connection device 345 after rotating it by 180 degrees.

FIGS. 4A, 4B, 4C, and 4D are other exemplary embodiments of graphics adapters in accordance with one or more aspects of the present invention. Graphics adapter 425, shown in FIG. 4A includes a GPU 405 that is coupled to a system connector 420 and to a graphics edge connector 401. System connector 420 is typically an industry standard connector configured to couple graphics adapter 400 to a motherboard. In some embodiments of the present invention GPU 405 is directly coupled to a display output connector 430. In other embodiments of the present invention, one or more additional devices may be affixed to the PCB supporting graphics adapter 425 and one of the additional devices may be coupled between GPU 405 and graphics edge connector 401.

Figure 4A:
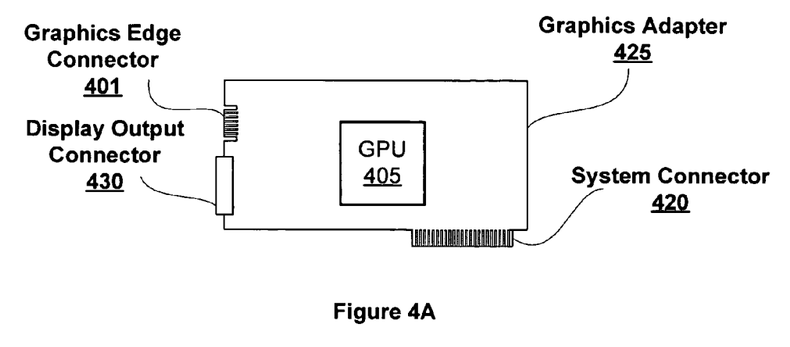
FIGS. 4A, 4B, 4C, 4D, and 4E are other exemplary embodiments of graphics adapters in accordance with one or more aspects of the present invention.

Graphics edge connector 401 is positioned on the bracket side of graphics adapter 425, adjacent to display edge connector 430. Although graphics edge connector 401 need not protrude outside of an enclosure containing a motherboard coupled to graphics adapter 425, a connection device coupling graphics adapter 425 to another graphics adapter may protrude outside of the enclosure. An advantage of this configuration is that an end-user does not necessarily need to open the enclosure to install the connection device. Also, graphics edge connector 401 may be used when a connection device coupled to a graphics edge connector, such as graphics edge connector 110 would obstruct an enclosure containing motherboard 300, thereby preventing proper installation of the enclosure.

Figure 4B:
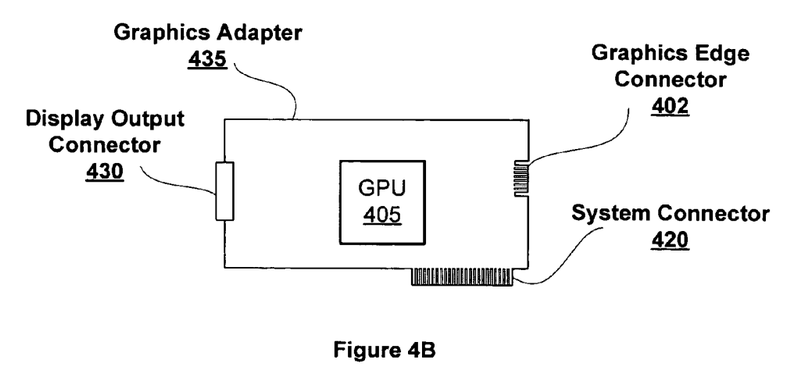

Graphics adapter 435, shown in FIG. 4B also includes GPU 405 coupled to system connector 420 and to a graphics edge connector 402. GPU 405 is directly or indirectly coupled to display output connector 430. Graphics edge connector 402 is positioned on a side of graphics adapter 435 opposing display output connector 430. Therefore, a connection device coupling graphics adapter 425 to another graphics adapter will not protrude outside of an enclosure containing a motherboard coupled to graphics adapter 435.

Figure 4C:
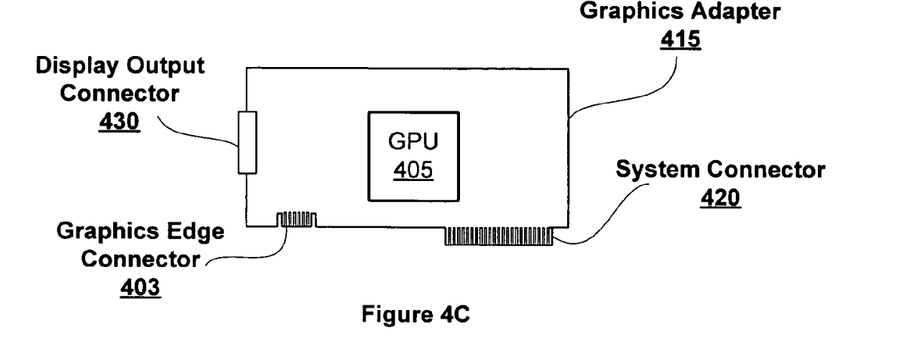

Graphics adapter 415, shown in FIG. 4C also includes GPU 405 coupled to system connector 420 and to a graphics edge connector 403. GPU 405 is directly or indirectly coupled to display output connector 430. Graphics edge connector 403 is positioned on a side of graphics adapter 415 adjacent to system connector 420. Therefore, a connection device coupling graphics adapter 415 to another graphics adapter will not protrude outside of an enclosure containing a motherboard coupled to graphics adapter 415. Although a single device, GPU 405 is shown in FIGS. 4A, 4B, and 4C, those skilled in the art will recognize that additional devices and components for performing a variety of functions, e.g. data storage, signal conversion, or the like, may be included in various embodiments of the present invention.

Figure 4D:
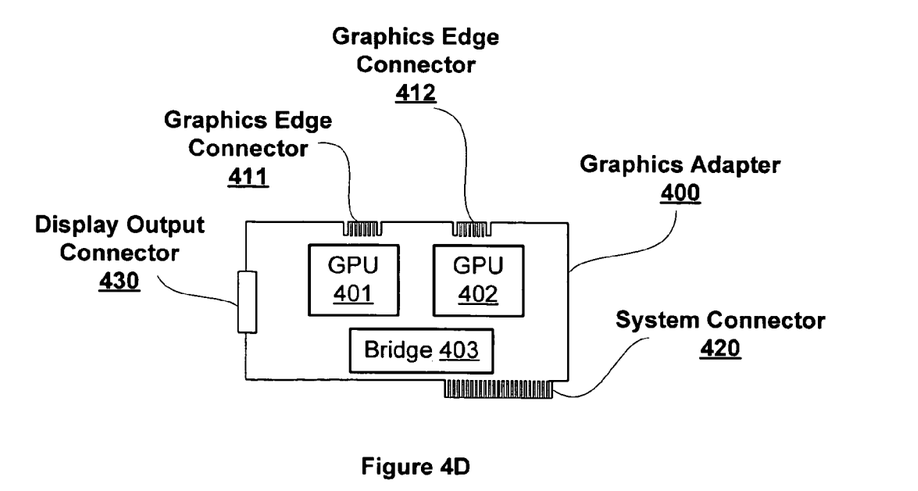

Graphics adapter 400, shown in FIG. 4D includes two GPUs, a GPU 401 and a GPU 402. The two GPUs are not necessarily configured to perform the same function, however each GPU is coupled to system connector 420 via a bridge device, bridge 403. Bridge 403 performs functions similar to bridge 335 shown in FIG. 3, interfacing between bridge 335 and each GPU included in graphics adapter 400. In other embodiments of the present invention, the functionality of bridge 403 is integrated into one or both of the GPUs and bridge 403 is omitted.

In some embodiments of the present invention each GPU is coupled to a single graphics edge connector. For example, GPU 401 is coupled to graphics edge connector 411 and GPU 402 is coupled to graphics edge connector 412. GPU 401 may be configured as a slave device and GPU 402 may be configured as a master device or visa versa. GPU 401 and GPU 402 may both be configured as slave devices or GPU 401 and GPU 402 may both be configured as master devices, each outputting image data to a different display device connected to display output connector 430.

In some embodiments of the present invention GPU 401 and GPU 402 are each coupled to both graphics edge connector 411 and graphics connector 412. When three or more graphics adapters are installed in a system and graphics adapter 400 is positioned between a slave graphics adapter and a master graphics adapter, image data is output via a first edge connector to the master graphics adapter. Image data is received from the slave graphics adapter via the second edge connector.

Figure 4E:
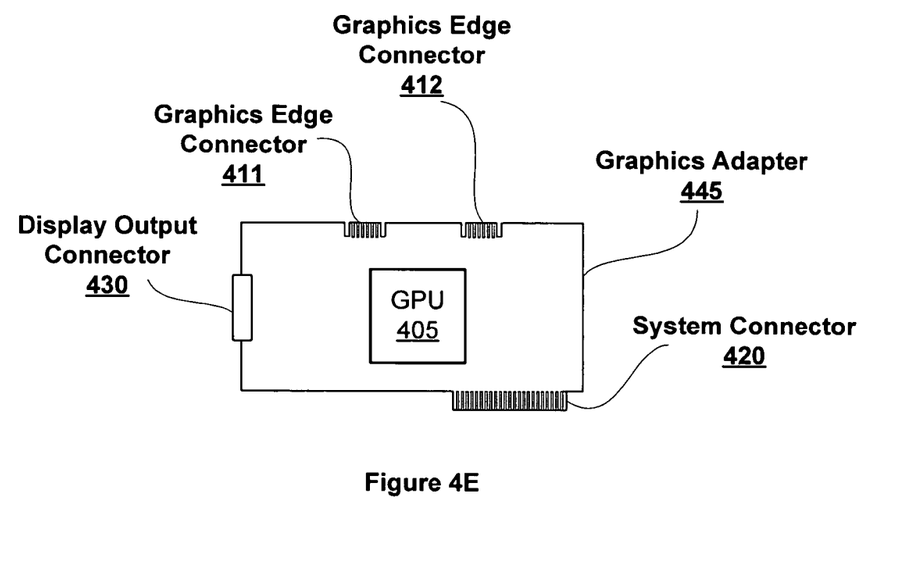

Graphics adapter 445, shown in FIG. 4E includes a single GPU, GPU 405 coupled to system connector 420 and to graphics edge connectors 411 and 412. Graphics adapter 445 may be positioned between a slave graphics adapter and either a master graphics adapter or another slave graphics adapter. GPU 405 provides signals for two ports and each port is coupled to a single graphics edge connector. GPU 405 may be configured to receive image data via one of connectors 411 or 412 and to output image data via connector 412 or 411, respectively. GPU 405 is directly or indirectly coupled to display output connector 430.

Although graphics edge connectors 411 and 412 are positioned on the side of graphics adapter 445 opposing system connector 420, one or both graphics edge connectors 411 and 412 may be positioned on a different side of graphics adapter 445. Furthermore, display output connector 430 may be omitted from any of graphics adapters 400, 415, 425, 435, and 445 to provide a graphics adapter that functions as an accelerator without a display output.

Figure 5A:
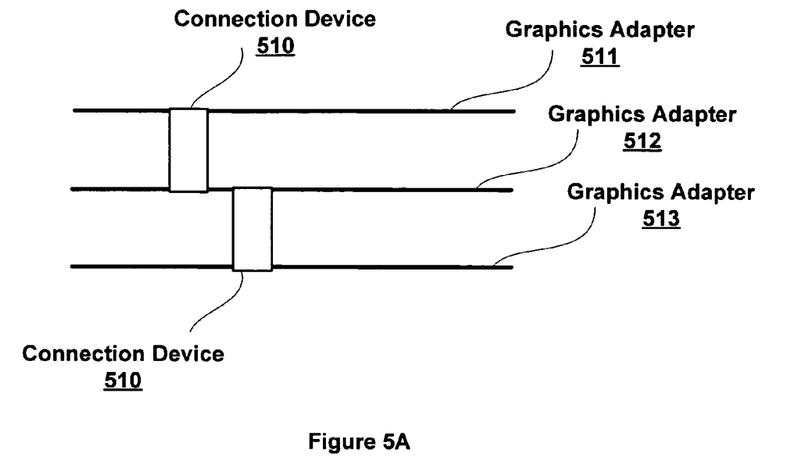
FIGS. 5A and 5B are other exemplary embodiments of connection device configurations in accordance with one or more aspects of the present invention.

FIG. 5A is an exemplary embodiment of a connection device configuration in accordance with one or more aspects of the present invention. Multiple graphics adapters, graphics adapters 511, 512, and 513, are coupled together using two connection devices 510. Each connection device 510 provides a point-to-point connection between two of the multiple graphics adapters. Specifically, a first connection device 510 couples a first graphics adapter, graphics adapter 511 and a second graphics adapter 512 via graphics edge connectors. Graphics adapter 511 may be a graphics adapter 100, 445, or 400 and graphics adapter 512 may be a graphics adapter 445 or 400. Therefore, the first connection device 510 may couple either graphics edge connector 110 to graphics edge connector 411 or graphics edge connectors 411. Graphics adapter 511 may be configured as a slave graphics adapter providing image data to graphics adapter 512 which may be configured as either a slave graphics adapter or a master graphics adapter. Alternatively, graphics adapter 511 may be configured as a master graphics adapter receiving image data from graphics adapter 512.

A second connection device 510 couples the second graphics adapter, graphics adapter 512 and a third graphics adapter, graphics adapter 513 via graphics edge connectors 411. Graphics adapter 513 may be a graphics adapter 100, 445, or 400. Therefore, the second connection device 510 may couple either graphics edge connector 110 to graphics edge connector 412 or graphics edge connectors 412. Graphics adapter 512 may be configured as a slave graphics adapter providing image data to graphics adapter 513 which may be configured as either a slave graphics adapter or a master graphics adapter. Alternatively, graphics adapter 512 may be configured as a master graphics adapter receiving image data from graphics adapter 513. When graphics adapter 513 is a graphics adapter 400, one GPU, such as GPU 401 may output image data to display output connector 430 while the other GPU, GPU 402 outputs image data to graphics adapter 512.

When the graphics adapter 512 is configured as a master graphics adapter it may receive image data from graphics adapters 511 and 513. When either graphics adapter 511 or graphics adapter 513 is configured as a master graphics adapter it may receive image data from graphics adapter 513 or graphics adapter 511, respectively, through graphics adapter 512. Alternatively, graphics adapters 511 and 513 may each be configured as master graphics adapters and when graphics adapter 512 is a graphics adapter 400, GPU 401 may output image data to graphics adapter 511 and GPU 402 may output image data to graphics adapter 513. Those skilled in the art will recognize that other configurations of the multiple graphics adapters may be used to produce image data for one or more display devices.

Figure 5B:
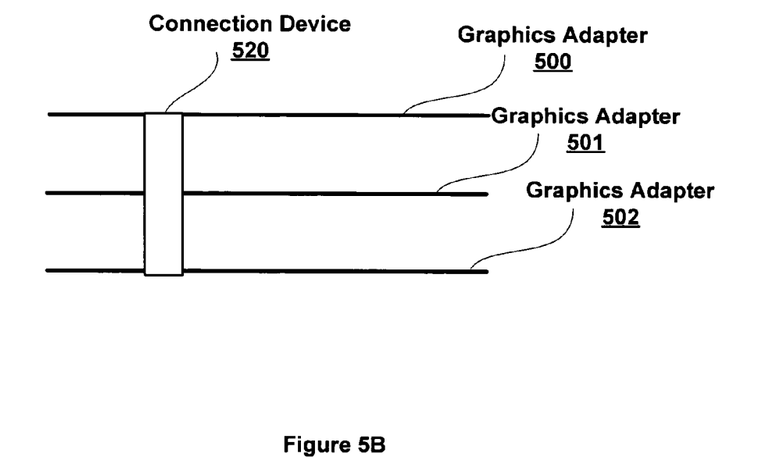

FIG. 5B is another exemplary embodiment of a connection device configuration in accordance with one or more aspects of the present invention. Multiple graphics adapters, such as graphics adapter 415, 425, 435, or 400, are coupled together using a connection device 520. In some embodiments of connection device 520, three sockets (one for each graphics adapter) are each configured to support signals for two ports and connection device 520 provides point-to-point connections between the graphics adapters. Specifically, connection device 520 provides a point-to-point connection between graphics adapter 500 and graphics adapter 501 and between graphics adapter 501 and graphics adapter 502.

Figure 6A:
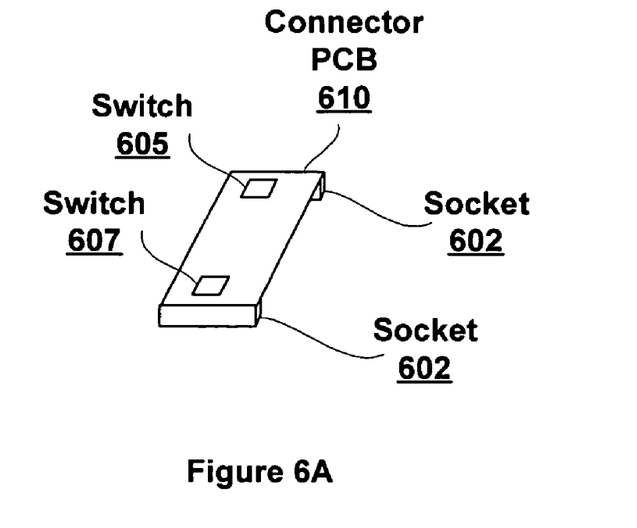
FIGS. 6A and 6B are other exemplary embodiments of connection devices in accordance with one or more aspects of the present invention.

In other embodiments of connection device 520, the connection to each graphics adapter may be selectively disabled using a switch, such as a programmable quickswitch component, as described in conjunction with FIG. 6A. For example, graphics adapter 500 may be configured as a master graphics adapter and graphics adapter 502 may be configured as a slave graphics adapter providing image data to graphics adapter 500 through connection device 520. Graphics adapter 501 may be configured as a master device, functioning independent from graphics adapters 500 and 502 with any connection to connection device 520 disabled.

FIG. 6A is another exemplary embodiment of a connection device in accordance with one or more aspects of the present invention. The connection device shown in FIG. 6A includes a connector PCB 610 with sockets 602 affixed to opposing ends of connector PCB 210. Although FIGS. 6A shows two sockets 602, additional sockets 602 may be used in other embodiments of the present invention. Conductive traces are fabricated as part of connector PCB 610 to directly connect pins of the socket 602 on one end of connector PCB 210 to pins of the socket 602 on the opposing end of connector PCB 610.

A switch 605 is affixed to connector PCB 610 and coupled to a socket 602 and a switch 607 is affixed to connector PCB 610 and coupled to the other socket 602. In some embodiments of the present invention, switch 605 and switch 607 may be manually set by an end-user to enable or disable a connection via socket 602. In other embodiments of the present invention, switch 605 and switch 607 may be configured through socket 602 to enable or disable a connection via socket 602.

Figure 6B:
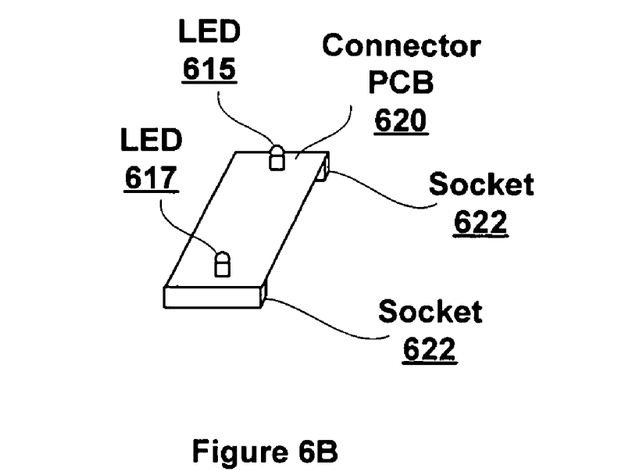

FIG. 6B is another exemplary embodiment of a connection device in accordance with one or more aspects of the present invention. The connection device shown in FIG. 6B includes a connector PCB 620 with sockets 622 affixed to opposing ends of connector PCB 220. Although FIGS. 6B shows two sockets 622, additional sockets 622 may be used in other embodiments of the present invention. Conductive traces are fabricated as part of connector PCB 620 to directly connect pins of the socket 622 on one end of connector PCB 220 to pins of the socket 622 on the opposing end of connector PCB 620.

An indication light, LED (light emitting diode) 615, is affixed to connector PCB 620 and coupled to one socket 622. Another indication light, LED 617 is affixed to connector PCB 620 and coupled to the other socket 622. A first signal controlling LED 615 may be generated by a first graphics adapter coupled to the one socket 622 and a second signal controlling LED 617 may be generated by a second graphics adapter coupled to the other socket 622. In some embodiments of the present invention, the first and the second signal may be generated to indicate whether each first graphics adapter or the second graphics is configured as a slave or as a master graphics adapter. In other embodiments of the present invention, the fist and the second signal may be generated to indicate whether each socket 622 is coupled to a graphics adapter. In still other embodiments of the present invention, the first and the second signal may be generated to indicate whether the first graphics adapter and the second graphics adapter are active, respectively.

An end-user may install one or more additional graphics adapters and one or more connection devices in a system to improve graphics processing performance, e.g., frame rate, image quality, or the like. Each connection device, such as those shown in FIGS. 2A, 2B, 3, 5A, 5B, 6A, and 6B provides a multi-bit digital connection through a finger-type edge connector included in each graphics adapter for the transfer of graphics image data, synchronization signals, and buffer management signals. Furthermore, inclusion of the finger-type edge connector as a graphics edge connector increases the cost of the graphics adapter less than the use of a traditional socket type of connector. Therefore, end-users of systems including a single graphics adapter incur only a small cost for the option to upgrade their graphics performance at a later date by installing an additional graphics adapter and connection device.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A graphics adapter printed circuit board, comprising:
a system connector configured to couple the graphics adapter printed circuit board to a motherboard;
a first graphics processing unit affixed to the graphics adapter printed circuit board and coupled to the system connector; and
a graphics edge connector, coupled to the first graphics processing unit and configured to couple to a first socket within a removable connection device, the removable connection device providing a portion of a multi-bit digital connection between the first graphics processing unit and a second graphics processing unit affixed to another graphics adapter printed circuit board when the edge connector is coupled to the first socket within the removable connection device, the removable connection device including a second socket, wherein the first socket and the second socket are electrically connected to provide the portion of the multi-bit connection between the first graphics processing unit and the second graphics processing unit.

2. The graphics adapter printed circuit board of claim 1, wherein the graphics edge connector is positioned on a side of the graphics adapter printed circuit board opposing the system connector.

3. The graphics adapter printed circuit board of claim 1, wherein the graphics edge connector is positioned adjacent to the system connector on a side of the graphics adapter printed circuit board.

4. The graphics adapter printed circuit board of claim 1, wherein the graphics edge connector is positioned adjacent to a display output connector on a side of the graphics adapter printed circuit board.

5. The graphics adapter printed circuit board of claim 1, wherein the graphics edge connector is positioned on a side of the graphics adapter printed circuit board opposing a display output connector.

6. The graphics adapter printed circuit board of claim 1, further comprising an additional graphics edge connector configured to couple to another removable connection device.

7. The graphics adapter printed circuit board of claim 1, wherein the connection device includes a flexible multi-bit cable and the first socket and the second socket are affixed to opposing ends of the multi-bit cable.

8. The graphics adapter printed circuit board of claim 1, wherein the connection device includes a printed circuit board and the first socket and the second socket are affixed to the printed circuit board.

9. The graphics adapter printed circuit board of claim 8, wherein the flexible multi-bit cable is sized to span between adjacent slots of a motherboard, each slot configured to receive the graphics adapter printed circuit board.

10. A connection device for providing a multi-bit digital connection between a first graphics adapter and a second graphics adapter, comprising:
a first socket configured to couple to a first graphics edge connector included within a printed circuit board supporting the first graphics adapter;
a second socket configured to couple to a second graphics edge connector included within a printed circuit board supporting the second graphics adapter; and
electrically conductive connections coupling each bit of the first socket to the second socket to provide the multi-bit digital connection between the first graphics adapter and the second graphics adapter.

11. The connection device of claim 10, wherein the connection device does not protrude more that one centimeter beyond the first graphics edge connector when coupled to the first graphics edge connector.

12. The connection device of claim 10, further comprising an indication light configured to signal when the first graphics adapter is active.

13. The connection device of claim 10, wherein the connection device configures the first graphics adapter as a master graphics adapter and configures the second graphics adapters as a slave graphics adapter.

14. The connection device of claim 10, further comprising an indication light configured to signal whether the first graphics adapter is a master graphics adapter or a slave graphics adapter for multi-adapter graphics processing.

15. The connection device of claim 10, further comprising a switch configured to enable or disable the first socket.

16. The connection device of claim 10, wherein the electrically conductive connections are traces on a printed circuit board on which the first socket and the second socket are mounted.

17. The connection device of claim 10, wherein the electrically conductive connections are wires within a flexible insulating wrapping.

18. The connection device of claim 10, further comprising an additional socket configured to couple to another graphics edge connector included within another printed circuit board supporting another graphics adapter.

19. The connection device of claim 10, wherein the first graphics edge connector includes signals for two ports.

* * * * *